US012692069B2

(12) United States Patent
Lee et al.

(10) Patent No.: US 12,692,069 B2
(45) Date of Patent: Jul. 28, 2026

(54) CEILING STORAGE SYSTEM AND CONTROL METHOD THEREOF

(71) Applicant: Samsung Electronics Co., Ltd., Suwon-si (KR)

(72) Inventors: Sang Kyung Lee, Suwon-si (KR); Seung Gyu Kang, Suwon-si (KR); Hyun Jae Kang, Suwon-si (KR); Young Wook Kim, Suwon-si (KR); Sang A Bang, Suwon-si (KR); Yong-Jun Ahn, Suwon-si (KR); Min Kyun Lee, Suwon-si (KR); Hyun Woo Lee, Suwon-si (KR); Jeong Hun Lim, Suwon-si (KR); Jun Hyuk Chang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 608 days.

(21) Appl. No.: 18/201,024

(22) Filed: May 23, 2023

(65) Prior Publication Data

US 2024/0076127 A1 Mar. 7, 2024

(30) Foreign Application Priority Data

Sep. 1, 2022 (KR) ........................ 10-2022-0110845

(51) Int. Cl.
*B65G 1/04* (2006.01)
*B65G 43/08* (2006.01)
*H10P 72/30* (2026.01)

(52) U.S. Cl.
CPC ......... B65G 1/0457 (2013.01); B65G 1/0464 (2013.01); B65G 43/08 (2013.01); *B65G 2203/0233* (2013.01); *B65G 2203/044* (2013.01)

(58) Field of Classification Search
CPC .... B65G 1/0457; B65G 1/0464; B65G 43/08; B65G 2203/0233; B65G 2203/044;
(Continued)

(56) References Cited

U.S. PATENT DOCUMENTS 8,070,473 B2    12/2011    Kozlak
9,589,821 B2 *   3/2017    Nishikawa ........ H01L 21/67733
(Continued)

FOREIGN PATENT DOCUMENTS

CN    106903540 A *  6/2017  ............... B23Q 5/00
CN    111199903 A *  5/2020  ....... H01L 21/67253
(Continued)

*Primary Examiner* — Jacob S. Scott
*Assistant Examiner* — Temesgen M. Maru
(74) *Attorney, Agent, or Firm* — Muir Patent Law, PLLC

(57) ABSTRACT

Provided is a ceiling storage system capable of correcting a working position and constantly checking stability of a structure by detecting an amount of change in a facility. According to the ceiling storage system, a transport vehicle moves to an upper portion of a first storage area of a plurality of storage areas in a state of gripping an article, and the transport vehicle measures a first distance value between the transport vehicle and the first storage area using a distance sensor and measures a relative position value between the transport vehicle and the first storage area using a vision sensor, before unloading the article from the first storage area.

16 Claims, 17 Drawing Sheets

(58) Field of Classification Search
CPC ........ B65G 2203/041; H01L 21/67769; H01L
21/67733; H01L 21/67259; H01L
21/6773; H01L 21/67736; H01L 21/681;
B66C 13/46
See application file for complete search history.

(56) References Cited

U.S. PATENT DOCUMENTS

| | | | |
|---|---|---|---|
| 9,623,555 | B2 | 4/2017 | Krupyshev et al. |
| 10,109,516 | B2 * | 10/2018 | Fosnight ............... H01L 21/677 |
| 10,242,898 | B2 * | 3/2019 | Kinugawa ......... H01L 21/67733 |
| 10,464,786 | B2 * | 11/2019 | Miyoshi .................. B66C 13/23 |
| 10,974,394 | B2 | 4/2021 | Benaim et al. |
| 11,694,452 | B1 * | 7/2023 | McCulley .............. G05B 19/05 |
| | | | 356/4.01 |
| 11,897,734 | B2 * | 2/2024 | Benzing .................. B66C 13/16 |
| 11,999,597 | B2 * | 6/2024 | Yamakawa ............. B66C 13/46 |
| 12,103,772 | B2 * | 10/2024 | Kim .................. H01L 21/67733 |
| 2009/0022575 | A1 * | 1/2009 | Tsuge ............... H01L 21/67727 |
| | | | 414/679 |
| 2012/0175334 | A1 * | 7/2012 | Chen ....................... B66C 19/00 |
| | | | 212/71 |
| 2013/0259617 | A1 * | 10/2013 | Wang ............... H01L 21/67769 |
| | | | 414/561 |

| | | | | |
|---|---|---|---|---|
| 2013/0333174 | A1 * | 12/2013 | Babbs ............... H01L 21/67736 |
| | | | | 29/25.01 |
| 2016/0126120 | A1 * | 5/2016 | Oza ................... H01L 21/67733 |
| | | | | 700/121 |
| 2022/0332500 | A1 * | 10/2022 | Masuda ............... B65G 1/0457 |
| 2023/0406631 | A1 * | 12/2023 | Park ................... B65G 1/0492 |
| 2024/0128113 | A1 * | 4/2024 | Shimizu ................. B66C 13/46 |

FOREIGN PATENT DOCUMENTS

| | | | | | |
|---|---|---|---|---|---|
| CN | 111199904 | A | * | 5/2020 | ....... H01L 21/67253 |
| CN | 111891927 | A | * | 11/2020 | ............ B66C 13/40 |
| DE | 4403898 | A1 | * | 8/1994 | .......... B66C 15/045 |
| DE | 19519741 | A1 | * | 12/1996 | ............ G01S 17/88 |
| DE | 10136398 | A1 | * | 3/2003 | ............ B66C 13/46 |
| EP | 0668237 | A1 | * | 8/1995 | ............ B66C 13/48 |
| KR | 10-1997-0005539 | A | | 2/1997 | |
| KR | 10-2014-0042190 | A | | 4/2014 | |
| KR | 10-2014-0147959 | A | | 12/2014 | |
| KR | 1020160111329 | A | | 9/2016 | |
| KR | 10-2016-0124947 | A | | 10/2016 | |
| KR | 10-2017-0006397 | A | | 1/2017 | |
| KR | 102415392 | B1 | * | 6/2022 | ....... H01L 21/67715 |
| WO | WO-2004016537 | A1 | * | 2/2004 | ............ B66C 13/46 |

* cited by examiner

CEILING STORAGE SYSTEM AND CONTROL METHOD THEREOF

CROSS-REFERENCE TO RELATED APPLICATION

This application claims priority under 35 U.S.C. § 119 from Korean Patent Application No. 10-2022-0110845 filed on Sep. 1, 2022, in the Korean Intellectual Property Office, and all the benefits accruing therefrom under 35 U.S.C. § 119, the contents of which in its entirety are herein incorporated by reference.

BACKGROUND

1. Technical Field

The present disclosure relates to a ceiling storage system and a control method thereof.

2. Description of the Related Art

As the production of semiconductor devices rapidly increases, a shortage of storage capacity of a storage system installed inside a semiconductor manufacturing facility (i.e., a fabrication plant or a fab) for producing the semiconductor devices is occurring. Such a shortage of storage capacity is one of the main factors that reduce a logistical efficiency of the entire fab.

Meanwhile, a stocker or a portable interface buffer occupies a footprint. Therefore, if the stocker or the portable interface buffer is added, the space for installing other equipment is reduced.

In addition, a side track buffer does not occupy the footprint as it is an overhead storage facility, but should be installed only on both sides of a path of an overhead transport apparatus (e.g., overhead hoist transport (OHT)). A dead space occurs in a branching and a rotating area of the overhead transport apparatus. In addition, for fabs that are already in operation, there may be no room in which side track buffers are additionally installed because an installation space is already saturated.

In addition, the overhead storage facility may be deformed due to the load of a robot (or a transport vehicle), a storage shelf, and a stored article. When such a deformation is accumulated for a long period of time and exceeds the working range of the robot, it is difficult for the robot to perform a normal operation. That is, a malfunction of the robot may occur or a transported object may fall and be damaged.

SUMMARY

Aspects of the present disclosure provide a ceiling storage system capable of correcting a working position and constantly checking stability of a structure by detecting an amount of change in equipment.

Aspects of the present disclosure also provide a control method of a ceiling storage system capable of correcting a working position and constantly checking stability of a structure by detecting an amount of change in equipment.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, there is provided a ceiling storage system including: an overhead rack including a plurality of storage areas for storing a plurality of articles; first and second support rails disposed above the overhead rack and extending lengthwise in one direction; a first driving rail disposed above the overhead rack and disposed in parallel with the first and second support rails; a second driving rail movably coupled to the first and second support rails and the first driving rail and moving along the first and second support rails and the first driving rail; a transport vehicle including a carriage coupled movably along the second driving rail, a hoist installed on the carriage and for loading and unloading the articles on the overhead rack, and a hand unit; and a distance sensor and a vision sensor installed on the transport vehicle, wherein the transport vehicle moves to an upper portion of a first storage area of the plurality of storage areas in a state of gripping the article, and the transport vehicle measures a first distance value between the transport vehicle and the first storage area using the distance sensor and measures a relative position value between the transport vehicle and the first storage area using the vision sensor, before unloading the article from the first storage area.

According to another aspect of the present disclosure, there is provided a control method of a ceiling storage system, the control method includes: providing the ceiling storage system including an overhead rack, a first support rail, a second support rail, and a first driving rail disposed above the overhead rack and extending lengthwise in a first direction, a second driving rail movably coupled to the first support rail, the second support rail, and the first driving rail, a transport vehicle movable along the second driving rail, and a distance sensor and a vision sensor installed on the transport vehicle; moving the transport vehicle to an upper portion of a first storage area of the plurality of storage areas in a state of gripping an article; measuring, by the transport vehicle, a first distance value between the transport vehicle and the first storage area using the distance sensor and measuring a relative position value between the transport vehicle and the first storage area using the vision sensor, before unloading the article from the first storage area; and calculating a three-dimensional position value of the first storage area based on the first distance value and the relative position value.

According to still another aspect of the present disclosure, there is provided a control method of a ceiling storage system, the control method includes: providing the ceiling storage system including an overhead rack on which a plurality of marks are installed, a first support rail, a second support rail, and a first driving rail disposed above the overhead rack and extending lengthwise in a first direction, a second driving rail movably coupled to the first support rail, the second support rail, and the first driving rail, a transport vehicle movable along the second driving rail, and a distance sensor and a vision sensor installed on the transport vehicle; moving the transport vehicle to an upper portion of a first storage area of the plurality of storage areas in a state of gripping an article; measuring a first distance value between the transport vehicle and the first storage area using the distance sensor; measuring a relative position value between the transport vehicle and the first storage area by photographing the plurality of markers using the vision sensor; calculating a three-dimensional position value of the first storage area based on the first distance value and the relative position value; checking whether the calculated three-dimensional position value is different from a pre-learned three-dimensional position value; correcting a position of the transport vehicle and updating a history of correcting the position of the transported vehicle, when the difference is within a tolerance; and generating an alarm indicating that work is impossible when the difference is out of the tolerance.

The details of other exemplary embodiments are included in the detailed description and drawings.

BRIEF DESCRIPTION OF THE DRAWINGS

The above and other aspects and features of the present disclosure will become more apparent by describing in detail exemplary embodiments thereof with reference to the attached drawings, in which:

FIG. 6 is a side view of the cross type overhead hoist crane illustrated in FIG. 4;

FIG. 17 is a view illustrating a control method of a ceiling storage system according to some exemplary embodiments of the present disclosure.

DETAILED DESCRIPTION OF THE EMBODIMENTS

Figure 1:
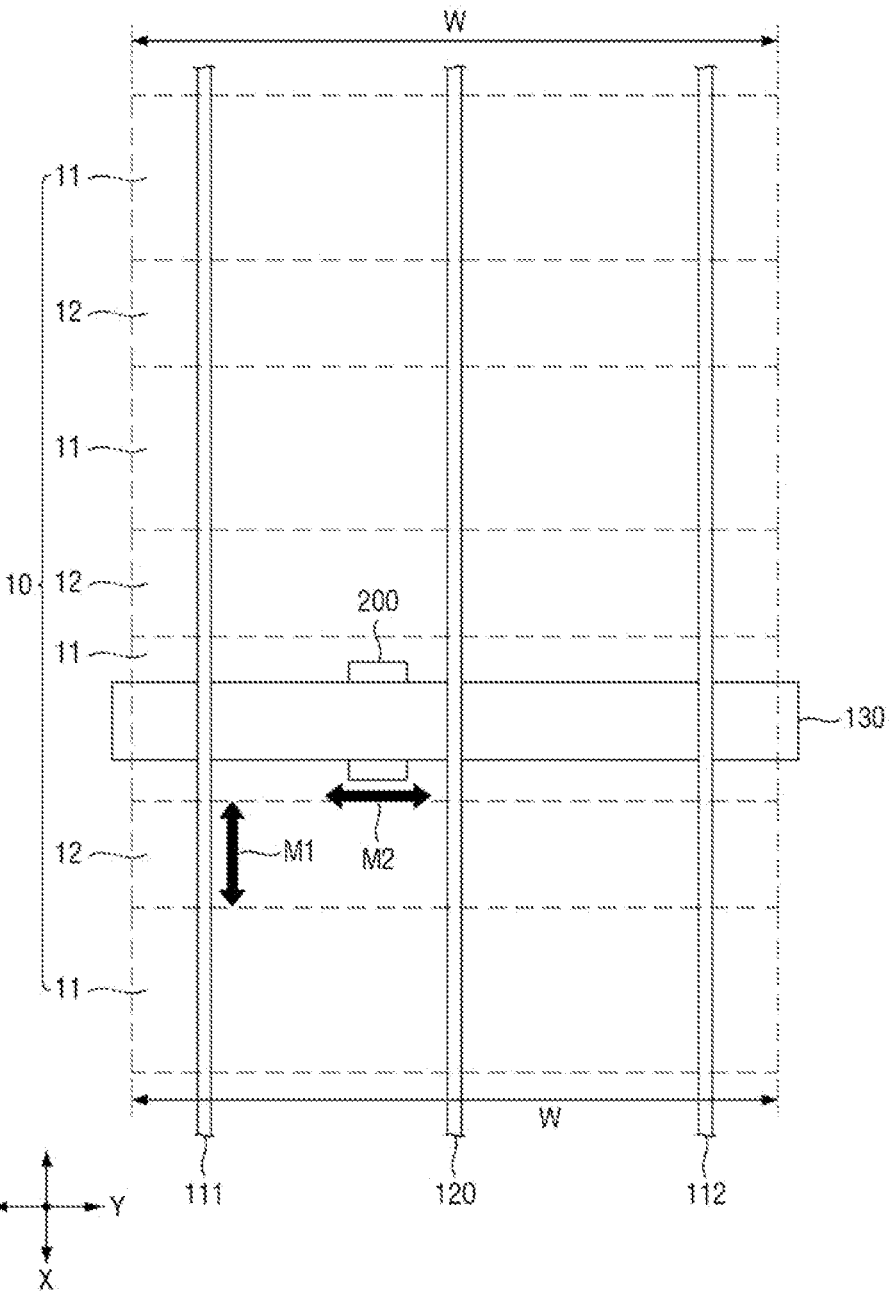
FIG. 1 is a block diagram illustrating a ceiling storage system according to some exemplary embodiments of the present disclosure.

Hereinafter, exemplary embodiments of the present disclosure will be described in detail with reference to the accompanying drawings. The same reference numerals are used for the same components in the drawings, and duplicate descriptions thereof are omitted.

Figure 2:
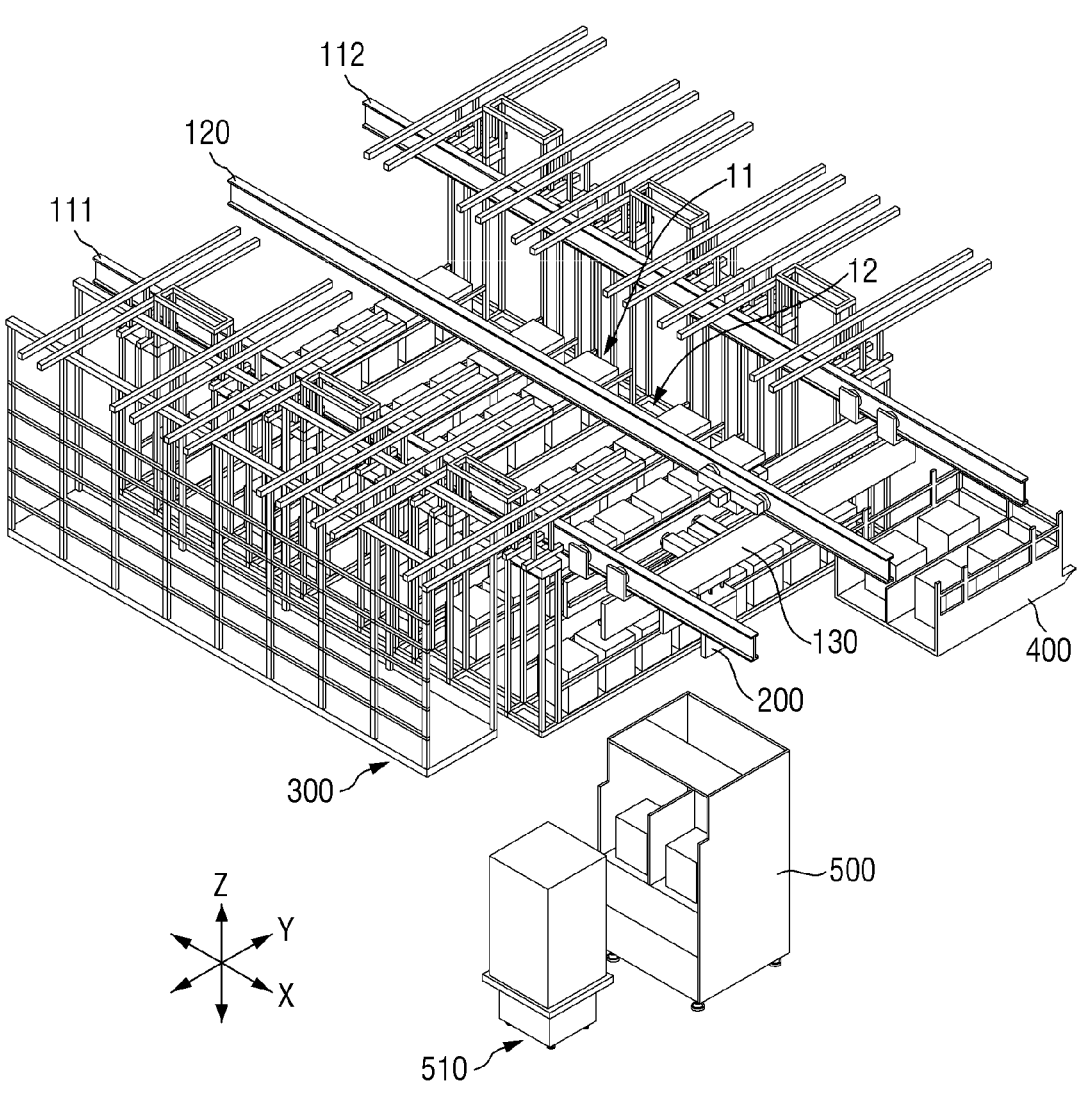
FIG. 2 is a perspective view specifically illustrating the ceiling storage system of FIG. 1.
Figure 3:
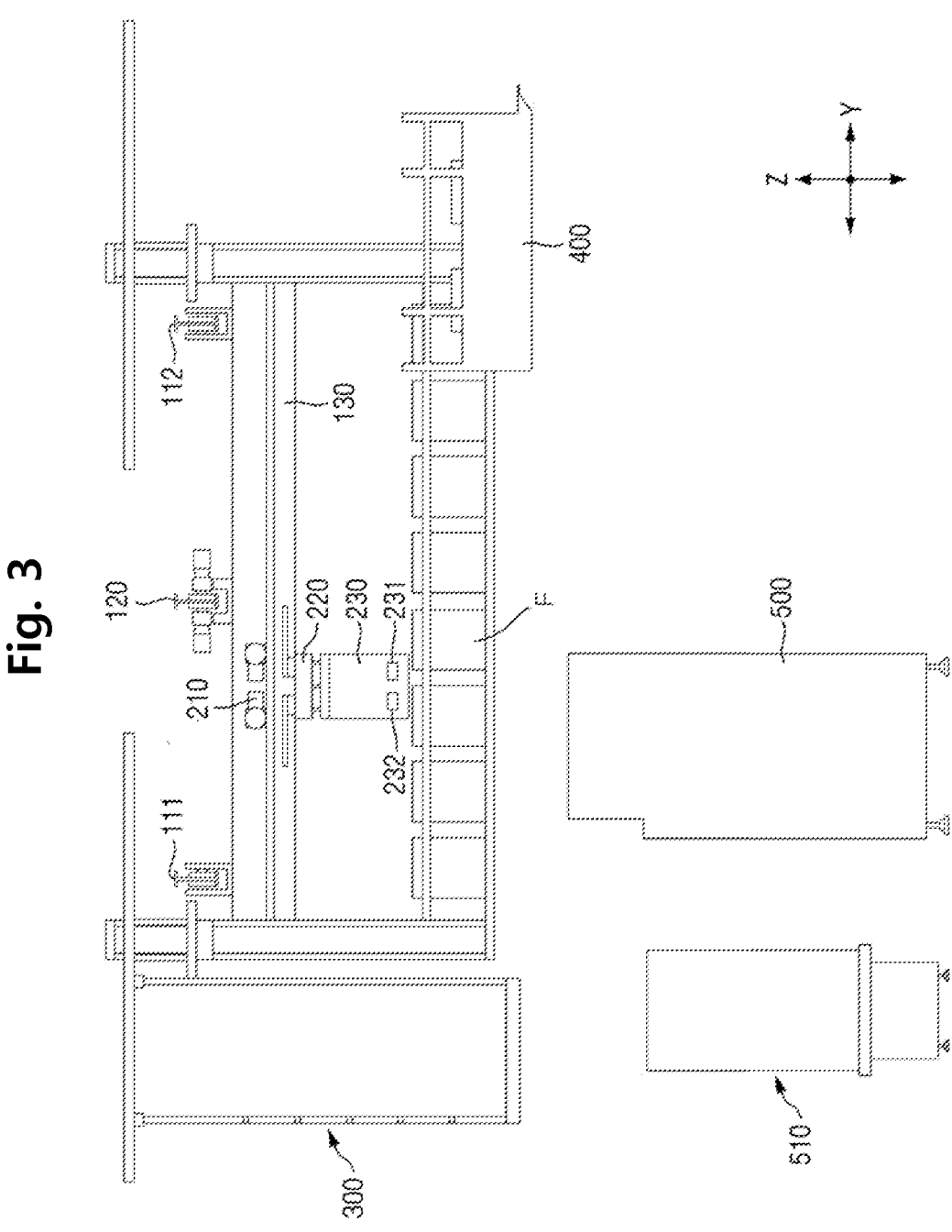
FIG. 3 is a side view illustrating the ceiling storage system of FIG. 1.

FIG. 1 is a block diagram illustrating a ceiling storage system according to some exemplary embodiments of the present disclosure. FIG. 2 is a perspective view specifically illustrating the ceiling storage system of FIG. 1. FIG. 3 is a side view illustrating the ceiling storage system of FIG. 1.

Referring to FIGS. 1 to 3, a ceiling storage system according to an exemplary embodiment of the present disclosure includes an overhead rack 10, a first support rail 111, a second support rail 112, a first driving rail 120, a second driving rail 130, a transport vehicle 200, and the like. In the ceiling storage system according to an exemplary embodiment of the present disclosure, a cross type overhead hoist crane is constituted using the first driving rail 120, the second driving rail 130, and the transport vehicle 200, and loads and unloads articles F positioned on the overhead rack 10.

The overhead rack 10 is installed on a ceiling of a fab, and may be fixed to the ceiling through a distinct attachment structure.

The overhead rack 10 includes a storage space 11 and a maintenance space 12. As illustrated, the storage space 11 may be a plurality of storage spaces 11 and the maintenance space 12 may be a plurality of maintenance spaces 12, and the plurality of storage spaces 11 and the plurality of maintenance spaces 12 may be alternately disposed along a first direction X.

The storage space 11 includes a plurality of storage areas for storing a plurality of articles F. Here, the article F may be a wafer storage container (e.g., a front opening unified pod (FOUP)), a reticle storage container, or the like, but is not limited thereto). Any article F may be applied as long as it may be moved by a transport vehicle/transport apparatus or the like.

The maintenance space 12 is a space for an operator to enter into the overhead rack 10. The operator may take out the articles F placed in the storage space 11 or perform repairs on the overhead rack 10, through the maintenance space 12.

On the other hand, the overhead rack 10 may further include an access road 300. The access road 300 is connected to a plurality of maintenance spaces 12. The operator is able to access the plurality of maintenance spaces 12 through the access road 300. The access road 300 is illustrated as extending in the first direction, but is not limited thereto. Any shape of the access road 300 is possible as long as the access road 300 has a shape that allows the operator to reach the plurality of maintenance spaces 12.

In FIG. 1, a length of the storage spaces 11 in the first direction X may be longer than a length of the maintenance spaces 12 in the first direction X. In addition, a width W of the storage spaces 11 in a second direction Y may be the same as a width W of the maintenance spaces 12 in the second direction Y. However, the size (e.g., length or width) of the maintenance spaces 12 may be any size as long as the operator may access corners of the storage spaces 11. For example, the width W of the maintenance spaces 12 in the second direction Y may be smaller than the width W of the storage spaces 11 in the second direction Y.

The first support rail 111 and the second support rail 112 are disposed above the overhead rack 10. The first support rail 111 and the second support rail 112 extend lengthwise in the first direction X.

The first driving rail 120 is disposed above the overhead rack 10. The first driving rail 120 may be disposed parallel to the first support rail 111 and the second support rail 112. That is, the first driving rail 120 may extend lengthwise in the first direction X.

The second driving rail 130 may be movably coupled to the first support rail 111, the second support rail 112, and the first driving rail 120. Accordingly, the second driving rail 130 may move along the first support rail 111, the second support rail 112, and the first driving rail 120. For example, the second driving rail 130 may move in the first direction X (see, e.g., movement M1 in FIG. 5). The second driving rail 130 is in three-point contact with/supported by the first support rail 111, the second support rail 112, and the first driving rail 120.

In addition, the second driving rail 130 may extend lengthwise in a direction different from the first direction X, for example, in the second direction Y perpendicular to the first direction X.

Figure 4:
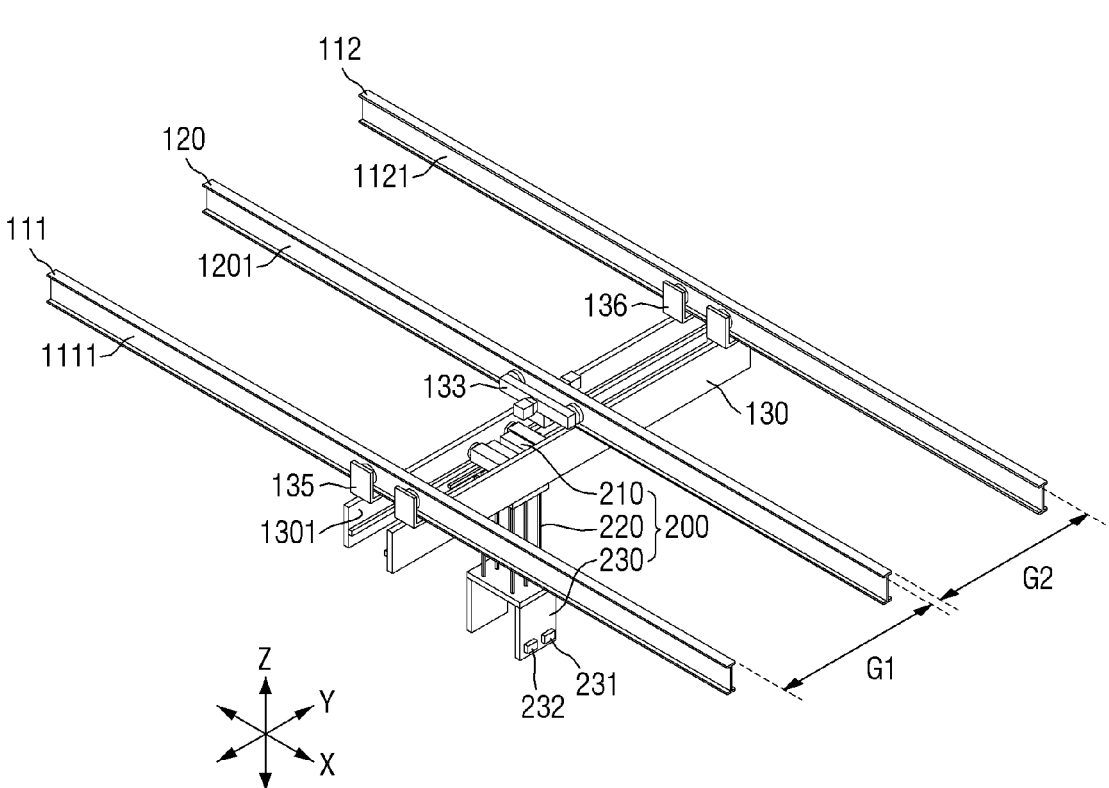
FIG. 4 is a perspective view illustrating a cross type overhead hoist crane illustrated in FIG. 2.

In addition, a driving wheel installed on the second driving rail 130 (i.e., a wheel rotating by a driving force so that the second driving rail 130 moves in the first direction X) rotates while being in contact with the first driving rail 120 (see FIG. 4). A guide wheel installed on the second driving rail 130 (i.e., a wheel that does not receive a driving force) rotates while being in contact with the first support rail 111 and the second support rail 112 (see FIG. 4). The guide wheel helps the second driving rail 130 to move stably without being inclined.

The first driving rail 120 may be disposed between the first support rail 111 and the second support rail 112, but is not limited thereto. For example, depending on the design, the first support rail 111 may be positioned between the first driving rail 120 and the second support rail 112, or the second support rail 112 may also be positioned between the first support rail 111 and the first driving rail 120.

The transport vehicle 200 may be movably coupled to the second driving rail 130. Accordingly, the transport vehicle 200 may move along the second driving rail 130. For example, the transport vehicle 200 may move in the second direction Y (see, e.g., movement M2 in FIG. 5).

The transport vehicle 200 includes a carriage 210, a hoist 220, a hand unit 230, a distance sensor 231, and a vision sensor 232, and the like.

The carriage 210 moves along the second driving rail 130. A driving wheel installed on the carriage 210 (i.e., a wheel rotating by a driving force so that the carriage 210 moves in the second direction Y) may rotate while being in contact with the second driving rail 130.

The hoist 220 is installed on the carriage 210, and is used for loading and unloading the articles F to and from the overhead rack 10. The hoist 220 may be stretched or shortened along the third direction Z.

The hand unit 230 is used for stably fixing the article F while the article F is moved by the transport vehicle 200. The hand unit 230 grips the article F. For example, the hand unit 230 may grip a preset area of the article F in the form of a gripper.

The distance sensor 231 is installed on the transport vehicle 200 and measures a distance (hereinafter referred to as a first distance value) between the transport vehicle 200 and the overhead rack 10. The distance sensor 231 may measure a distance from the overhead rack 10 to a first storage area (see, e.g., first storage area 11a in FIG. 10) among a plurality of storage areas in the transport vehicle 200. The first storage area refers to a storage area in which a controller instructs the transport vehicle 200 to perform an operation (load operation or unload operation). Although it will be described later in detail, before performing the above-mentioned operation, the first distance value between the transport vehicle 200 and the first storage area may be measured using the distance sensor 231.

Although it is illustrated in the drawing that the distance sensor 231 is installed on the hand unit 230, the present disclosure is not limited thereto. The distance sensor 231 may be, for example, a laser sensor, an ultrasonic sensor, an infrared sensor, or the like, but the distance sensor 231 is not limited thereto.

The vision sensor 232 is installed on the transport vehicle 200 and measures a relative position (hereinafter referred to as a relative position value) between the transport vehicle 200 and the overhead rack 10. The vision sensor 232 may measure a relative position value between the transport vehicle 200 and the first storage area. Although it will be described later in detail, before the operation (load operation or unload operation) is performed, the relative position value between the transport vehicle 200 and the first storage area may be measured using the vision sensor 232.

The relative position value may include an X-axis position value and a Y-axis position value. In addition, the relative position value may further include an R-axis position value (i.e., a rotation value or a 0 value). In addition, the relative position value may further include a Z-axis position value (i.e., a height or a second distance value).

Although it is illustrated in the drawing that the vision sensor 232 is installed on the hand unit 230, the present disclosure is not limited thereto. A camera may be used as the vision sensor 232, but the vision sensor 232 is not limited thereto.

In addition, although it is illustrated in the drawing that the distance sensor 231 and the vision sensor 232 are both installed on one side of the hand unit 230, the present disclosure is not limited thereto. The distance sensor 231 may be disposed on one side of the hand unit 230, and the vision sensor 232 may also be disposed on the other side of the hand unit 230.

Meanwhile, referring to FIGS. 2 and 3, optionally, the ceiling storage system according to some exemplary embodiments of the present disclosure may further include a first interface port 400 and/or a second interface port 500.

The first interface port 400 is installed on the ceiling of the fab and is disposed to be adjacent to the overhead rack 10. The first interface port 400 may also be disposed on a side surface of the overhead rack 10 and may also be disposed on an upper side of the overhead rack 10. The first interface port 400 may be used to deliver the article to a transport apparatus installed on the ceiling (e.g., overhead hoist transport (OHT) or another transport vehicle that moves along an overhead rail). The first interface port 400 may include, for example, a conveyor system for moving a position of the article. The conveyor system may move the article in a preset direction.

For example, the transport vehicle 200 picks up the article from the overhead rack and moves, and then puts the article down on the first interface port 400. The first interface port 400 moves the position of the article using the conveyor system. Another transport apparatus (OHT) picks up the moved article.

As another example, another transport apparatus (OHT) puts the article down on one side of the first interface port 400. The first interface port 400 moves the position of the article using the conveyor system. The transport vehicle 200 picks up the moved article from the first interface port 400, and puts the article down at a designated position of the overhead rack 10.

In summary, by using the first interface port 400, the transport vehicle 200 and another transport apparatus (OHT) may exchange the article. Even if the overhead rack and the transport apparatus OHT are far apart from each other, it is sufficient to elongate and install the first interface port 400 disposed between the overhead rack 10 and the transport apparatus OHT. Therefore, the position at which the overhead rack 10 is installed may be freely installed irrespective of the transport apparatus OHT.

The second interface port 500 may be installed on a bottom surface of the fab. The second interface port 500 may be installed below the overhead rack 10. The second interface port 500 may be used to deliver the article to an operator or an autonomous mobile vehicle 510 (e.g., an autonomous mobile robot (AMR), an automated guided vehicle (AGV), and the like). The second interface port 500 may have an opened upper surface. The transport vehicle 200 may load and unload the article to and from the second interface port 500 through the opened upper surface.

For example, the transport vehicle 200 picks up the article from the overhead rack and moves, and then puts the article down inside the second interface port 500 through the opened upper surface. The operator or the autonomous mobile vehicle 510 takes out the article from the second interface port 500.

As another example, the operator or the autonomous mobile vehicle 510 puts the article down inside the second interface port 500. The transport vehicle 200 picks up and takes the article through the opened upper surface of the second interface port 500.

The cross type overhead hoist crane will be described in more detail with reference to FIGS. 4 to 6.

FIG. 4 is a perspective view illustrating a cross type overhead hoist crane illustrated in FIG. 2. FIG. 5 is a plan view illustrating the cross type overhead hoist crane illustrated in FIG. 4, and FIG. 6 is a side view illustrating the cross type overhead hoist crane illustrated in FIG. 4.

Figure 5:
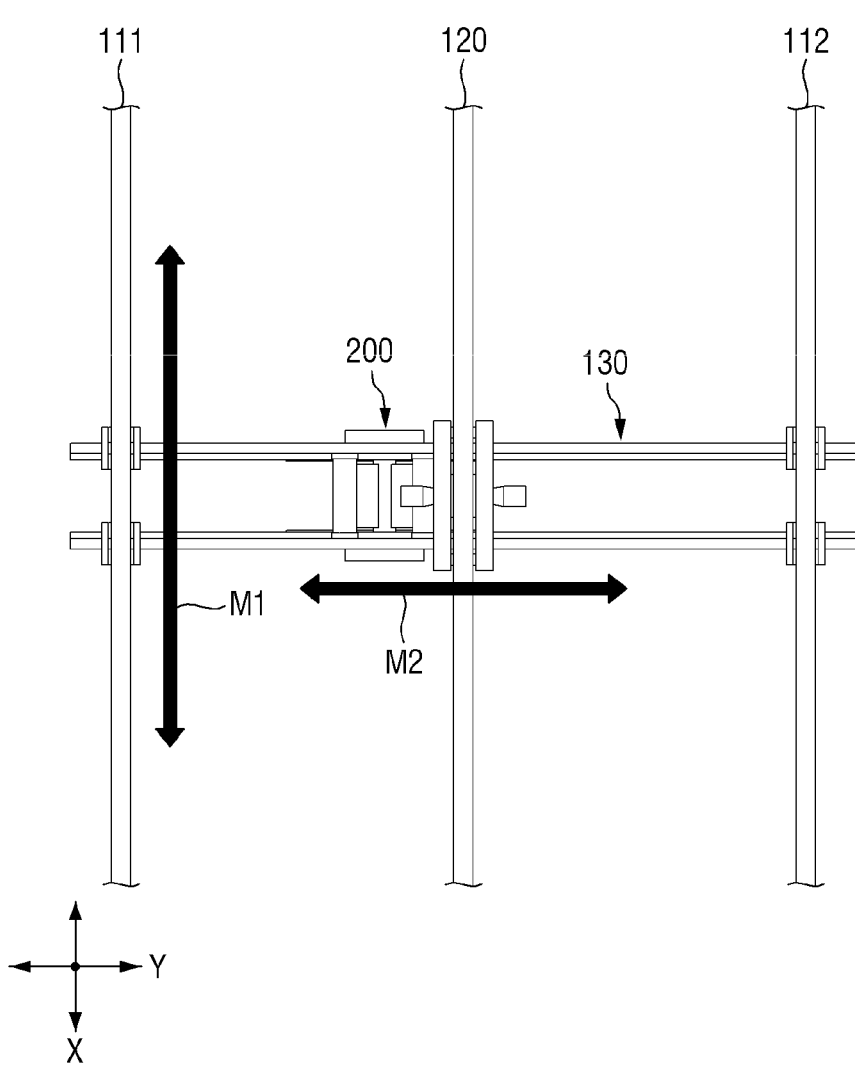
FIG. 5 is a plan view of the cross type overhead hoist crane illustrated in FIG. 4.
Figure 6:
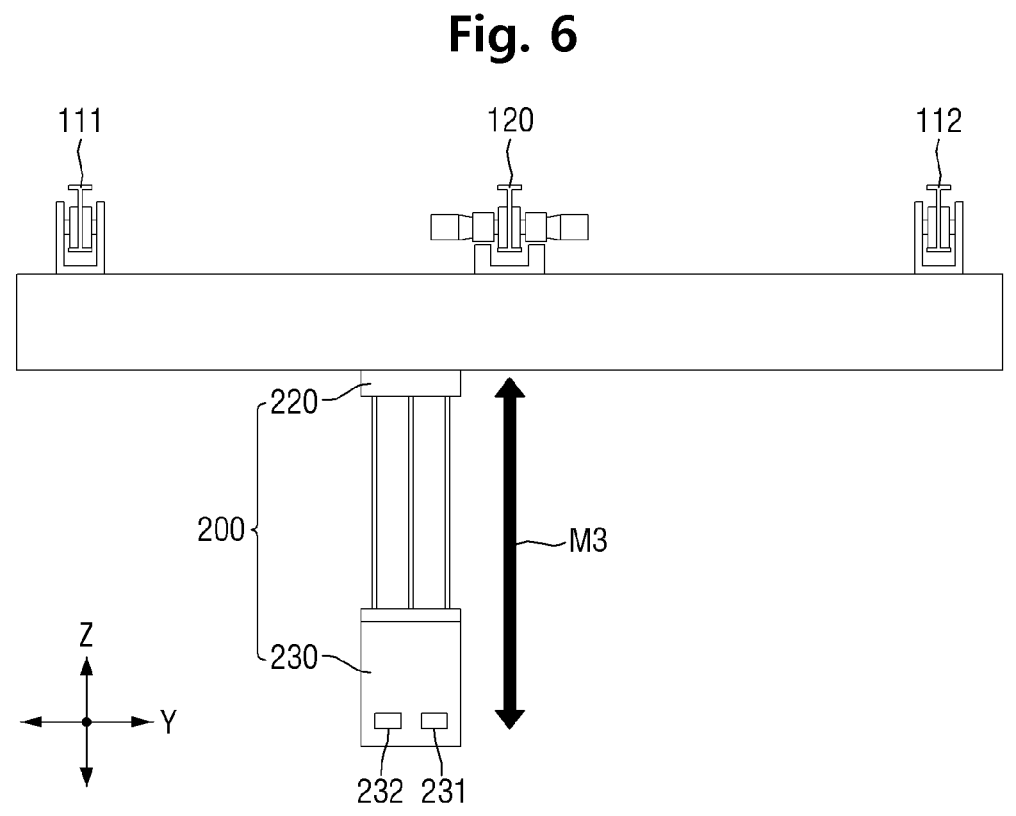

Referring to FIGS. 4 to 6, in the ceiling storage system according to some exemplary embodiments of the present disclosure, a cross type overhead hoist crane is constructed using the first driving rail 120, the second driving rail 130, and the transport vehicle 200.

The first driving rail 120 extends lengthwise in the first direction X. The first support rail 111 and the second support rail 112 may extend lengthwise in the first direction X and to be in parallel to the first driving rail 120.

The second driving rail 130 extends lengthwise in the second direction Y different from the first direction X. The second direction Y may be a direction perpendicular to the first direction X.

The second driving rail 130 is positioned below the first driving rail 120, the first support rail 111, and the second support rail 112.

A driving wheel 133, a first guide wheel 135, and a second guide wheel 136 are installed on an upper surface of the second driving rail 130. A motor for providing a driving force may be connected to the driving wheel 133.

A groove 1201 is formed in a side surface of the first driving rail 120 to extend lengthwise in the first direction X, and the driving wheel 133 rotates along the groove 1201 while being in contact with the groove 1201. A groove 1111 is formed in a side surface of the first support rail 111 to extend lengthwise in the first direction X, and the first guide wheel 135 rotates along the groove 1111 while being in contact with the groove 1111. A groove 1121 is formed in a side surface of the second support rail 112 to extend lengthwise in the first direction X, and the second guide wheel 136 rotates along the groove 1121 while being in contact with the groove 1121.

Since the second driving rail 130 is movably coupled to the first driving rail 120, the first support rail 111, and the second support rail 112, the second driving rail 130 is supported at three points. For example, since a load of the second driving rail 130 is distributed to the three rails 120, 111, and 112, a load condition is reduced.

In addition, since the center of the second driving rail 130 is supported by the first driving rail 120, and both ends of the second driving rail 130 are supported by the first support rail 111 and the second support rail 112, respectively, a length (or span) of the second driving rail 130 may be further increased. If the length of the second driving rail 130 is further increased, a gap G1 between the first driving rail 120 and the first support rail 111 may be further increased, and a gap G2 between the first driving rail 120 and the second support rail 112 may be further increased within a range that may support the load of the second driving rail 130.

Meanwhile, a movement path 1301 is installed to extend lengthwise along the second direction Y inside the second driving rail 130.

The transport vehicle 200 may move in the second direction Y along the movement path 1301.

The transport vehicle 200 includes a carriage 210, a hoist 220, a hand unit 230, and the like.

A driving wheel installed on the carriage 210 may rotate while being in contact with the movement path 1301 of the second driving rail 130. In order to prevent the carriage 210 from colliding with the first driving rail 120, the first support rail 111, and the second support rail 112 during movement, a height of the carriage 210 is lower than a thickness of the second driving rail 130 (i.e., a length in a third direction Z). In addition, since the carriage 210 moves within the second driving rail 130, diffusion of particles or fumes that may occur while the carriage 210 moves may be reduced.

The hoist 220 is installed on the carriage 210, and is stretched or shortened along the third direction Z.

The hand unit 230 is connected to an end of the hoist 220 and serves to stably fix the article. The hand unit 230 may include, for example, a multi joint arm and a gripper installed at an end of the arm. By using the multi-joint arm, the gripper may be moved to a designated position. By using the hoist 220 and the hand unit 230, the transport vehicle 200 may pick up the article at a designated position without a separate rotation shaft.

Here, referring to FIG. 5, the movement M1 in the first direction X is implemented by moving the second driving rail 130, and the movement M2 in the second direction Y is implemented by moving the carriage 210 of the transport vehicle 200.

Referring to FIG. 6, a movement M3 in the third direction Z is implemented by stretching or shortening the hoist 220 of the transport vehicle 200.

The overhead rack, which is an article storage space, will be described in more detail with reference to FIGS. 7 to 9.

Figure 7:
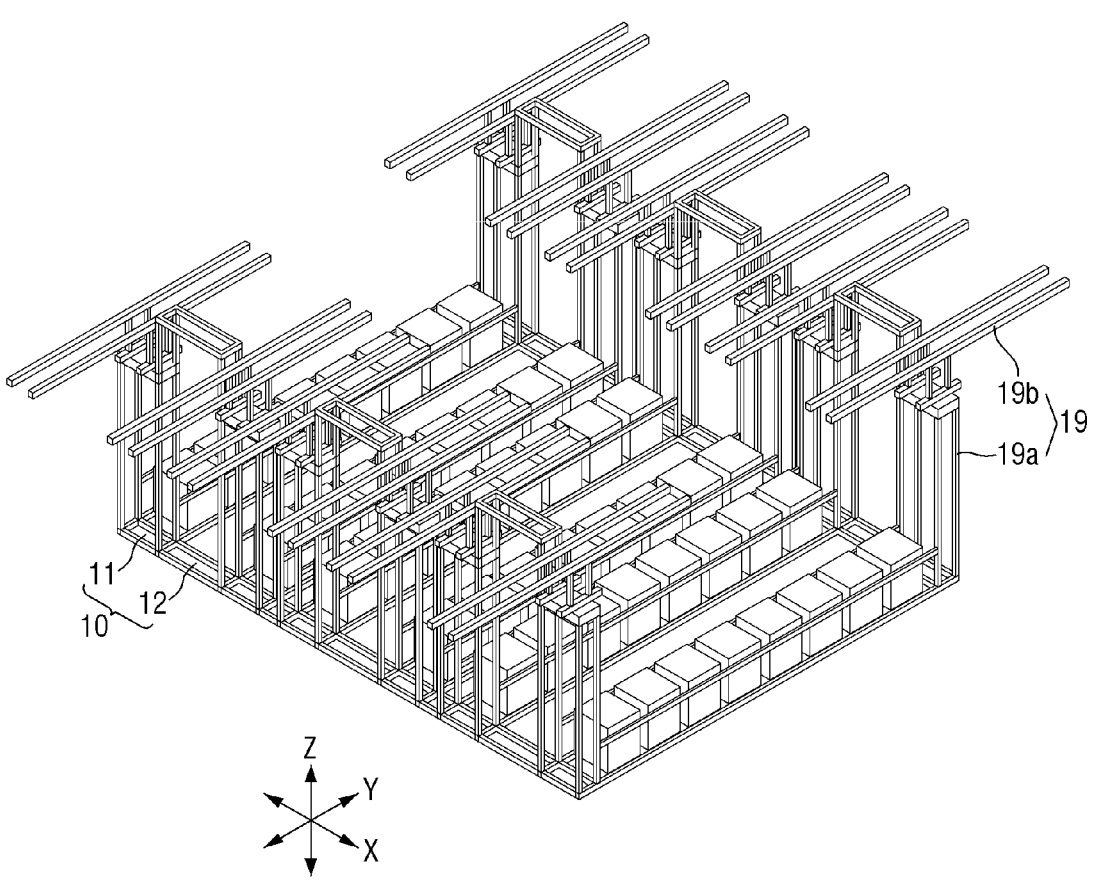
FIG. 7 is a perspective view illustrating an overhead rack illustrated in FIG. 2.

FIG. 7 is a perspective view illustrating an overhead rack illustrated in FIG. 2. FIG. 8 is a plan view of the overhead rack illustrated in FIG. 7, and FIG. 9 is a side view of the overhead rack illustrated in FIG. 7.

Figure 8:
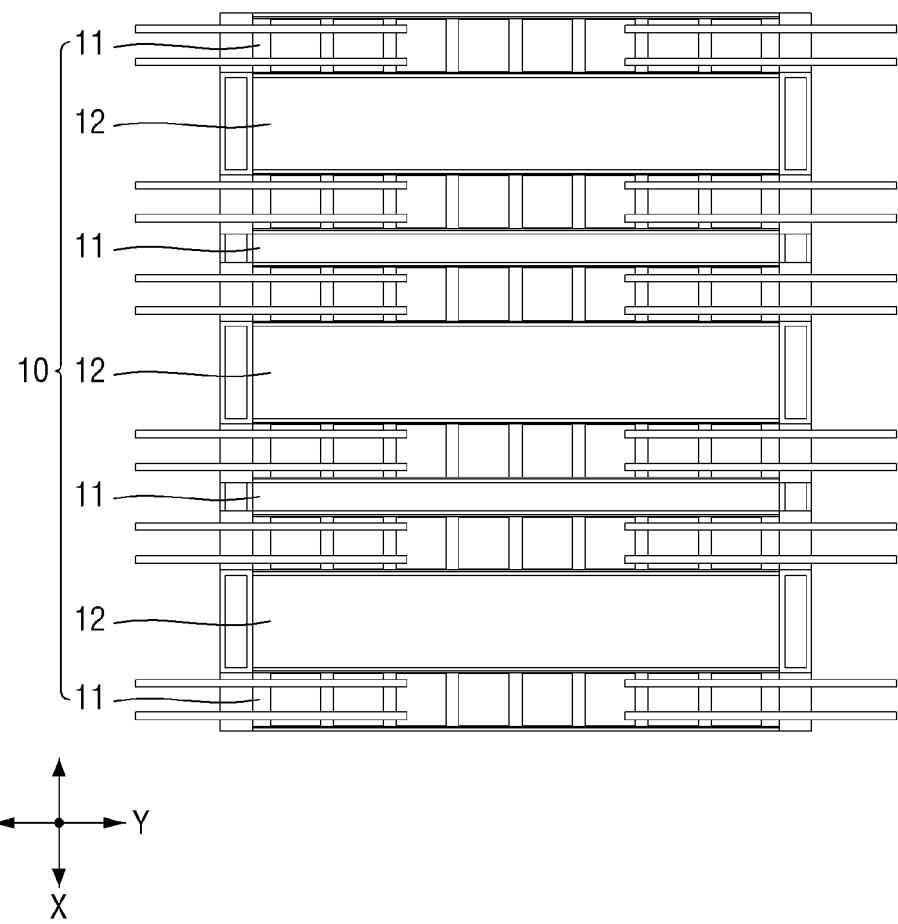
FIG. 8 is a plan view of the overhead rack illustrated in FIG. 7.
Figure 9:
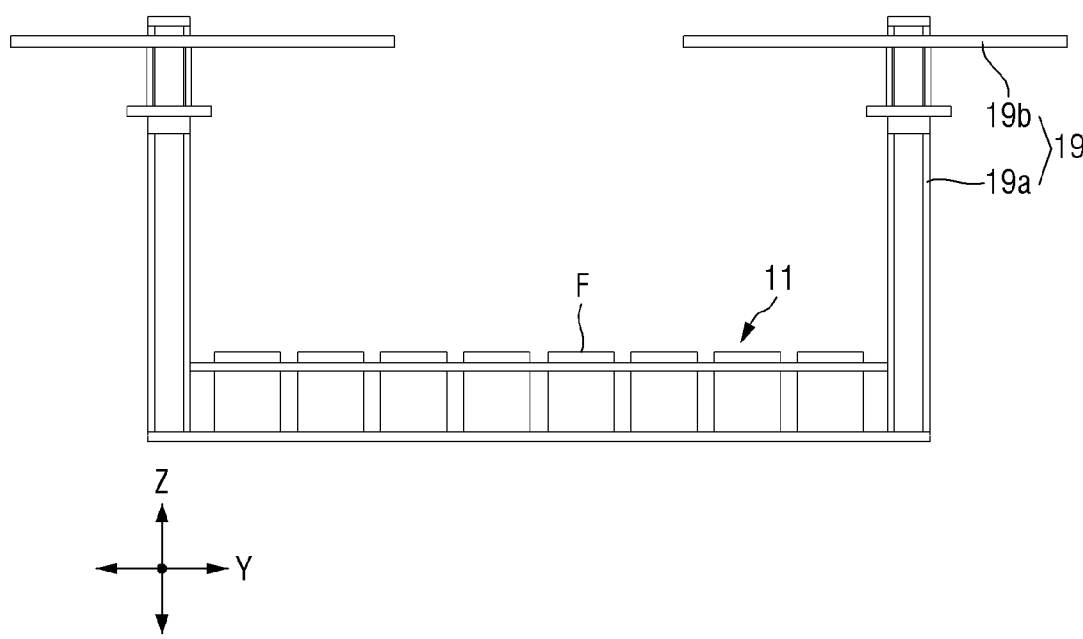
FIG. 9 is a side view of the overhead rack illustrated in FIG. 7.

Referring to FIGS. 7 to 9, the overhead rack 10 is installed on the ceiling of the fab, and is fixed to the ceiling through a distinct attachment structure 19.

The attachment structure 19 may include a first portion 19a and a second portion 19b. The first portion 19a may be connected to both sides of the overhead rack 10 and extend in a vertical direction. The second portion 19b extends in a horizontal direction, and the first portion 19a is connected to and fixed to the second portion 19b.

As illustrated in FIG. 8, the overhead rack 10 includes a storage space 11 for storing articles, and a maintenance space 12 for an operator to enter into the overhead rack 10.

A plurality of storage spaces 11 and a plurality of maintenance spaces 12 may be alternately disposed with each other.

Hereinafter, operations of the distance sensor 231 and the vision sensor 232 will be described with reference to FIGS. 10 to 13.

Figure 10:
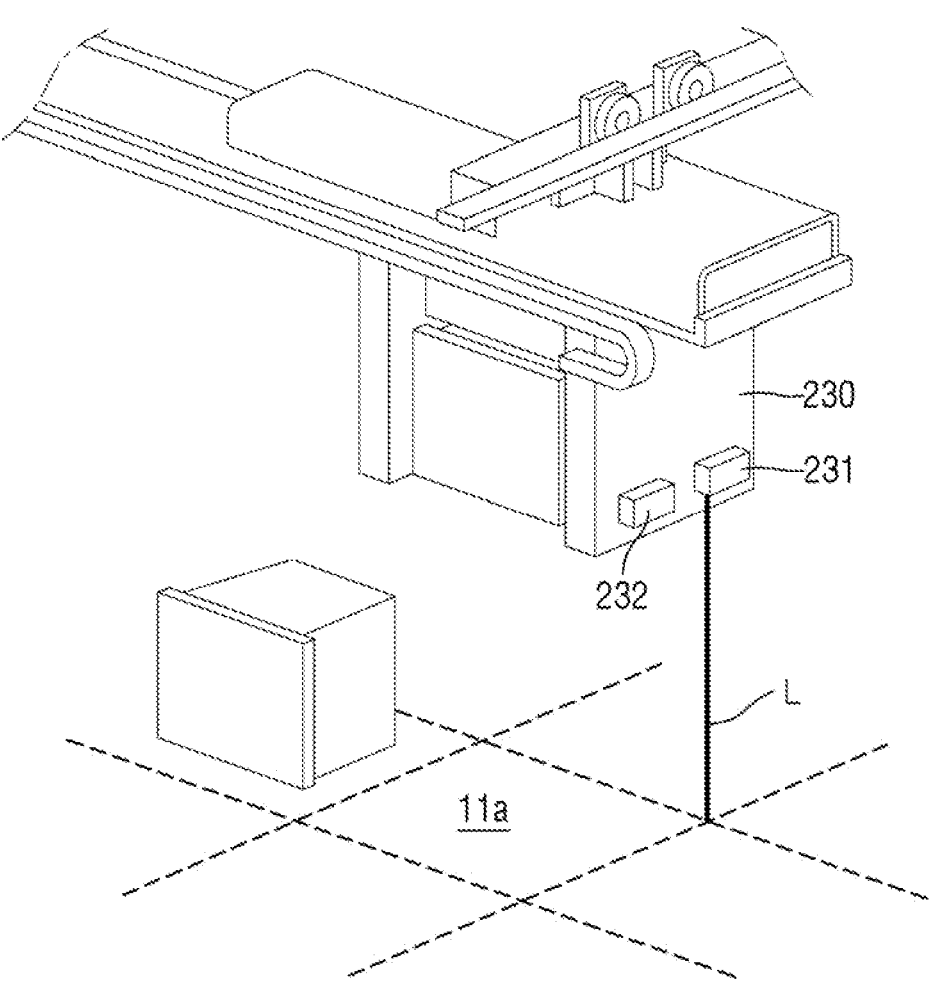
FIGS. 10 and 11 are views illustrating an operation of a distance sensor installed in the ceiling storage system according to some exemplary embodiments of the present disclosure.
Figure 11:
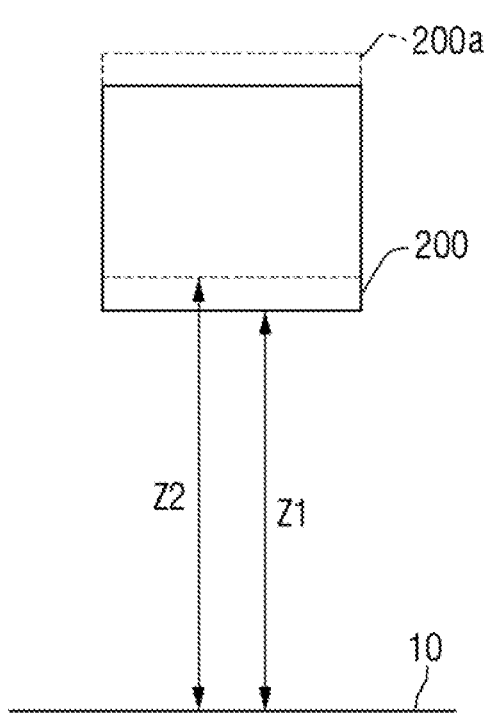

FIGS. 10 and 11 are views illustrating an operation of a distance sensor installed in the ceiling storage system according to some exemplary embodiments of the present disclosure.

First, referring to FIG. 10, in an upper portion of the first storage area 11a in the transport vehicle 200, the distance sensor 231 measures a distance (i.e., a first distance value) between the transport vehicle 200 and the overhead rack 10. The first distance value may correspond to a vertical height or a Z-axis position value.

For example, when the distance sensor 231 is a laser sensor, the laser sensor may measure the first distance value by irradiating a laser L to a preset position around the first storage area 11a and receiving a reflected laser. The preset position may be marked separately or may not be marked at all. Alternatively, a reflector may also be installed at the preset position.

The first distance values measured by the distance sensor 231 may be history managed. For example, the first distance values measured at a plurality of points of time are stored, and an amount of change of the stored first distance values is managed. When the measured first distance value exceeds a preset threshold value, an alarm may be generated. A manager (or an operator) may analyze and/or correct a cause of the alarm. Alternatively, when an amount of change between the first distance value measured previously and the first distance value measured currently exceeds a preset value, an alarm may be generated and the manager may analyze and/or correct the alarm.

Referring to FIG. 11, a height of the transport vehicle 200 measured previously (or measured at a first point of time) may be different from a height of the transport vehicle 200a measured currently (or measured at a second point of time). Here, a first distance value Z1 measured at the first point of time and a second distance value Z2 measured at the second point of time may be different.

As described above, since the height (or the first distance value) of the transport vehicle 200 may vary depending on the measurement point of time, the history management is performed.

Figure 12:
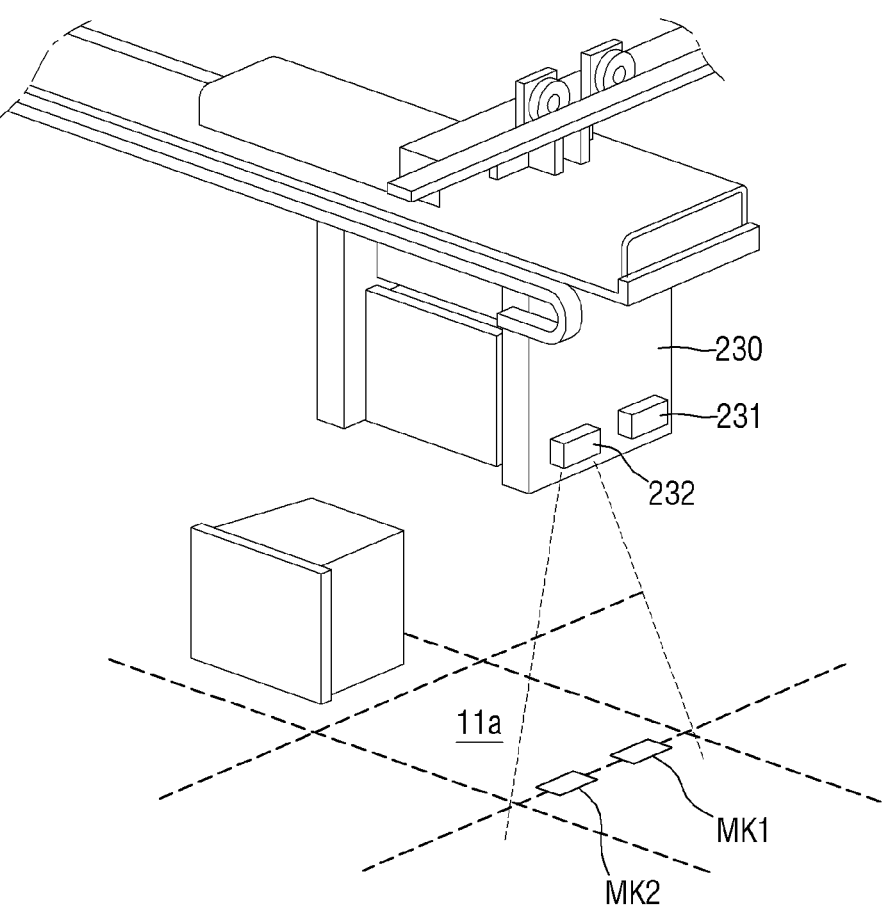
FIGS. 12 and 13 are views illustrating an operation of a vision sensor installed in the ceiling storage system according to some exemplary embodiments of the present disclosure.
Figure 13:
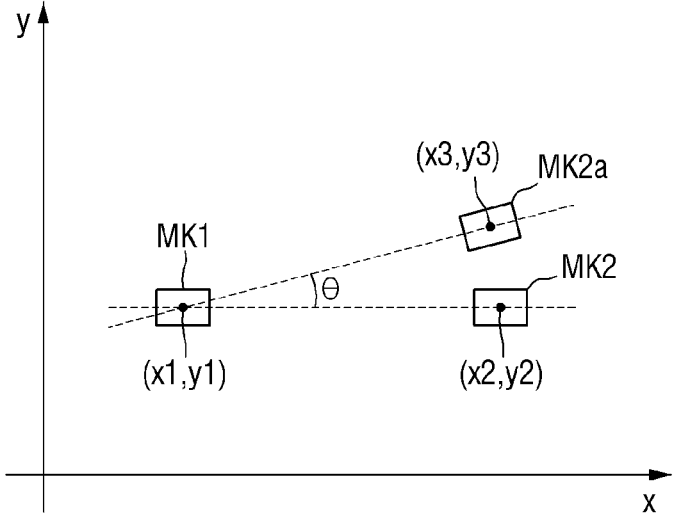

FIGS. 12 and 13 are views illustrating one operation of a vision sensor installed in the ceiling storage system according to some exemplary embodiments of the present disclosure.

First, referring to FIG. 12, in an upper portion of the first storage area 11a in the transport vehicle 200, the vision sensor 232 measures a relative position value between the transport vehicle 200 and the first storage area 11a. In example embodiments, the vision sensor 232 may use at least one marker to measure a relative position value between the transport vehicle 200 and the first storage area 11a.

Specifically, first and second markers MK1 and MK2 are installed on the overhead rack 10. Although it is illustrated in the drawing that two markers MK1 and MK2 are installed, the present disclosure is not limited thereto. A first marker MK1 and a second marker MK2 may be arranged in a line around the first storage area 11a, but are not limited thereto.

The controller calculates coordinate values of the first and second markers MK1 and MK2 from an image measured by the vision sensor 232. The coordinate values of the one or more markers MK1 and MK2 may correspond to a relative position value between the transport vehicle 200 and the first storage area 11a. For example, the relative position value may include an X-axis position value and a Y-axis position value.

The coordinate values of the markers MK1 and MK2 measured by the vision sensor 232 may be history managed. For example, coordinate values measured at a plurality of points of time may be stored, and an amount of change of the stored coordinate values may be managed.

As illustrated in FIG. 13, from a previously measured image (or an image measured at the first point of time), the coordinate value of the first marker MK1 may be calculated as (x1, y1), and the coordinate value of the second marker MK2 may be calculated as (x2, y2). In addition, from a currently measured image (or an image measured at the second point of time), the coordinate value of the first marker MK1 may be calculated as (x1, y1), and a coordinate value of a second marker MK2a may be calculated as (x3, y3). For example, the relative position value may include an X-axis position value and a Y-axis position value.

As in the example of FIG. 13, when the position of the marker MK1 does not change and only the position of the other marker MK2 changes, an amount of change in the changed position of the marker MK2 (i.e., a distance between (x2, y2) and (x3, y3)) may be calculated. Such an amount of change may be a Euclidean distance, a Manhattan distance, a Hamming distance, or the like, but is not limited thereto.

In addition, an angle θ formed by a virtual straight line passing through the first marker MK1 and the second marker MK2 and a virtual straight line passing through the first marker MK1 and the second marker MK2a may also be calculated. Such an angle θ may also correspond to a relative position value between the transport vehicle 200 and the first storage area 11a. For example, the relative position value may further include an R-axis position value.

On the other hand, a second distance value (i.e., a Z-axis position value) between the transport vehicle 200 and the overhead rack 10 (or the first storage area 11a) may also be calculated using the image measured by the vision sensor 232.

However, when the distance between the transport vehicle 200 and the overhead rack 10 is calculated using only the vision sensor 232 without using the distance sensor 231, it may be difficult to determine whether an error occurs in a load/unload operation because there is an error in a quality of the markers (MK1, MK2), or whether an error occurs because there is an error in measuring the distance between the transport vehicle 200 and the overhead rack 10.

However, by comparing the first distance value calculated using the distance sensor 231 with the second distance value calculated using the vision sensor 232, the quality of the markers MK1 and MK2 installed on the overhead rack 10 may be checked. For example, if the first distance value and the second distance value are substantially the same, it may be expected that the quality of the markers MK1 and MK2 is abnormal.

Figure 14:
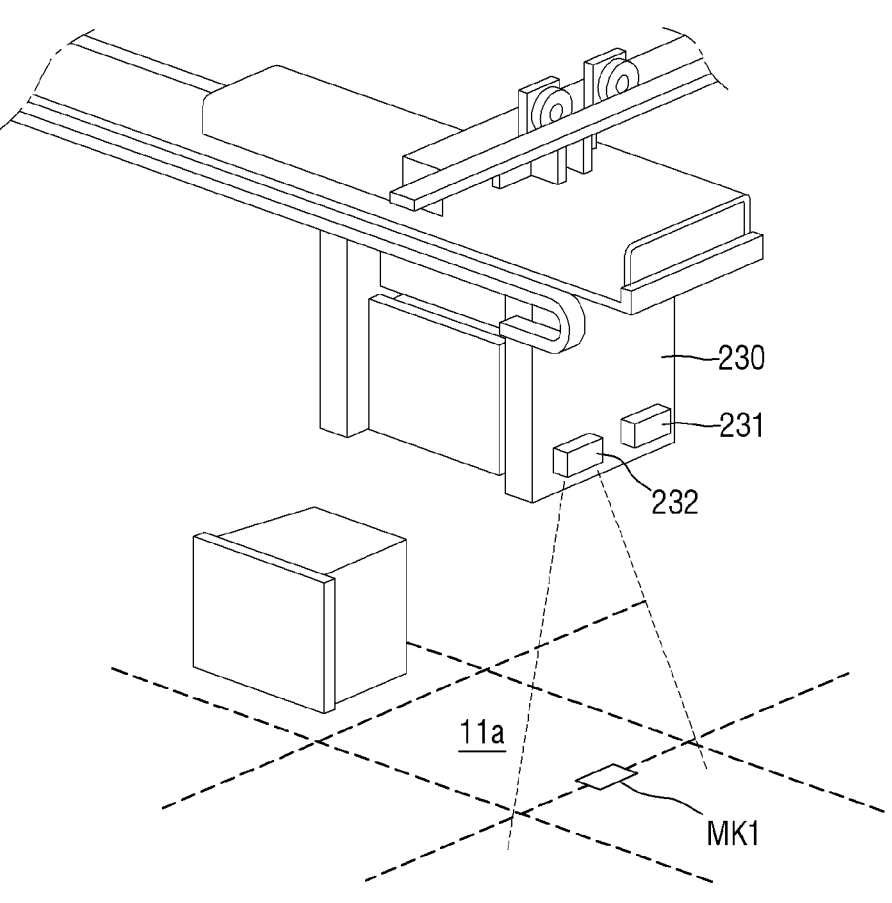
FIG. 14 is a view illustrating another operation of the vision sensor installed in the ceiling storage system according to some exemplary embodiments of the present disclosure.

FIG. 14 is a view illustrating another operation of the vision sensor installed in the ceiling storage system according to some exemplary embodiments of the present disclosure.

Referring to FIG. 14, one marker MK1 is installed around the first storage area 11a in the overhead rack 10.

A coordinate value of the marker MK1 is calculated from an image measured by the vision sensor 232. The calculated coordinate value of the marker MK1 may correspond to a relative position value between the transport vehicle 200 and the first storage area 11a. For example, the relative position value may include an X-axis position value and a Y-axis position value. The coordinate values of the marker MK1 measured by the distance sensor 231 may be history managed. For example, coordinate values measured at a plurality of points of time may be stored, and an amount of change of the stored coordinate values may be managed.

Since only one marker MK1 is installed, the R-axis position value is not calculated.

Additionally, a second distance value (i.e., a Z-axis position value) between the transport vehicle 200 and the overhead rack 10 (or the first storage area 11a) may also be calculated using the image measured by the vision sensor 232.

Figure 15:
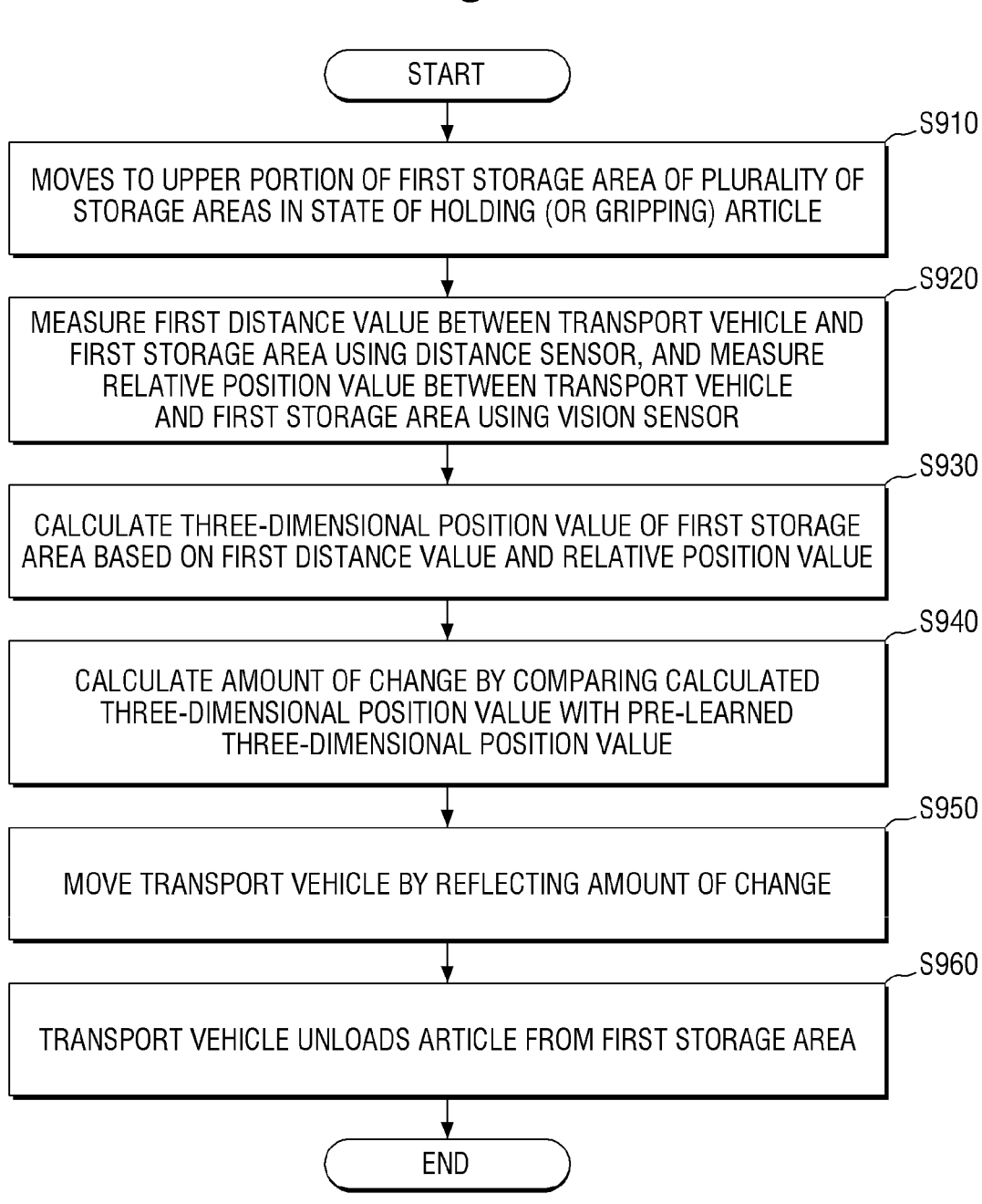
FIG. 15 is a flowchart illustrating a control method of a ceiling storage system according to some exemplary embodiments of the present disclosure.

FIG. 15 is a flowchart illustrating a control method of a ceiling storage system according to some exemplary embodiments of the present disclosure. For convenience of explanation, points different from those described with reference to FIGS. 1 to 14 will be mainly described.

Referring to FIGS. 10 to 13 and 15, the transport vehicle 200 moves to an upper portion of the first storage area 11a of the plurality of storage areas in a state of holding (or gripping) the article (see S910 in FIG. 15). Specifically, the controller moves the transport vehicle 200 according to a pre-stored teaching value corresponding to the first storage area 11a.

Next, a first distance value between the transport vehicle 200 and the first storage area 11a is measured using the distance sensor 231, and a relative position value between the transport vehicle 200 and the first storage area 11a is measured using the vision sensor 232 (see S920 in FIG. 15).

Specifically, as described above with reference to FIGS. 10 and 11, when the distance sensor 231 is the laser sensor, the laser sensor may measure the first distance value by irradiating a laser to the preset position around the first storage area 11a and receiving the reflected laser. The first distance value may correspond to a vertical height or a Z-axis position value.

The vision sensor 232 photographs one or more markers MK1 and MK2 installed on the overhead rack 10, and calculates coordinate values of the one or more markers MK1 and MK2 from the photographed images. The coordinate values of the one or more markers MK1 and MK2 may correspond to a relative position value between the transport vehicle 200 and the first storage area 11a. The relative position value includes an X-axis position value and a Y-axis position value, and may further include an R-axis position value.

Next, a three-dimensional position value of the first storage area is calculated based on the first distance value and the relative position value (see S930 in FIG. 15).

Specifically, since the first distance value is the Z-axis position value, and the relative position value includes the X-axis position value and the Y-axis position value, the three-dimensional position value of the first storage area 11a may be calculated. For example, since the first distance value is z1 and the relative position value may be expressed as (x1, y1), the three-dimensional position value may be expressed as (x1, y1, z1).

Next, an amount of change is calculated by comparing the calculated three-dimensional position value with a pre-learned three-dimensional position value (see S940 in FIG. 15).

Specifically, the pre-learned three-dimensional position value may be expressed as (x0, y0, z0).

The amount of change between the calculated three-dimensional position value and the pre-learned three-dimensional position value may be, for example, calculated as a distance between the calculated three-dimensional position value and the pre-learned three-dimensional position value. Here, the distance may be a Euclidean distance, a Manhattan distance, a Hamming distance, or the like, but is not limited thereto. In example embodiments, the amount of change may include an amount of change in at least one of an X-axis direction, a Y-axis direction, and an R-axis direction.

Next, the transport vehicle 200 is moved by reflecting the amount of change (S950 in FIG. 15). For example, the transport vehicle 200 is moved based on the amount of change.

Specifically, the transport vehicle 200 is moved within a workable range of the first storage area 11a. The workable range of the first storage area 11a means a range in which an article may be put down on the first storage area 11a or an article may be lifted from the first storage area 11a. As a result of calculating the amount of change, when the transport vehicle 200 is positioned within the workable range of the first storage area 11a, the transport vehicle 200 does not need to be moved. On the other hand, as the result of calculating the amount of change, when the transport vehicle 200 is positioned outside the workable range of the first storage area 11a, the transport vehicle 200 is moved within the workable range of the first storage area 11a. For example, the transport vehicle 200 may be moved to reflect the amount of change.

Alternatively, the transport vehicle 200 may be moved so that the amount of change becomes substantially zero.

Next, the transport vehicle 200 unloads the article from the first storage area 11a (see S960 in FIG. 15).

Additionally, after the transport vehicle 200 unloads the article from the first storage area 11a, the teaching value corresponding to the first storage area 11a may be modified by reflecting the amount of change. In addition, it is possible to manage a history of the amount of change or the modified teaching value.

Figure 16:
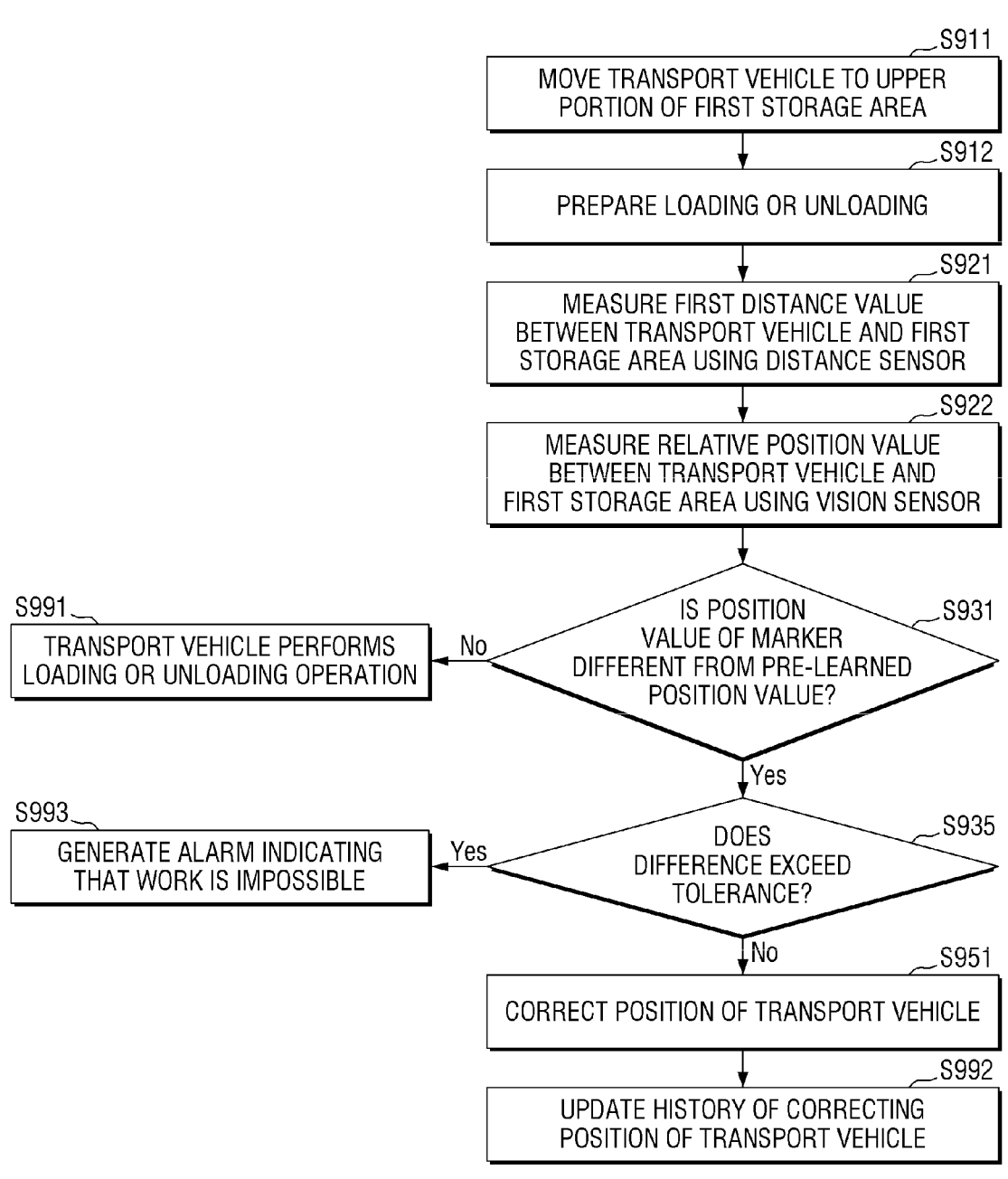
FIG. 16 is a flowchart illustrating a control method of a ceiling storage system according to some exemplary embodiments of the present disclosure.

FIG. 16 is a flowchart illustrating a control method of a ceiling storage system according to some exemplary embodiments of the present disclosure. For convenience of explanation, portions different from those described with reference to FIG. 15 will be mainly described.

Referring to FIGS. 10 to 13 and 16, the transport vehicle 200 is moved to the upper portion of the first storage area 11a (see S911 of FIG. 16). Specifically, the controller moves the transport vehicle 200 according to a pre-stored teaching value corresponding to the first storage area 11a.

Next, loading or unloading is prepared (see S912 in FIG. 16).

Next, a first distance value between the transport vehicle 200 and the first storage area 11a is measured using the distance sensor 231 (see S921 in FIG. 16). The first distance value may correspond to a vertical height or a Z-axis position value.

Next, a relative position value between the transport vehicle 200 and the first storage area 11a is measured using the vision sensor 232 (see S922 in FIG. 16). An image may be generated by photographing a marker (e.g., MK1) using the vision sensor 232, and the relative position value may be measured using the image. The relative position value includes an X-axis position value and a Y-axis position value, and may further include an R-axis position value.

Next, it is checked whether the position value of the marker (e.g., MK1) is different from the pre-learned position value (see S931 in FIG. 16).

Specifically, the position value (three-dimensional position value) of the marker corresponds to the first distance value and the relative position value calculated in steps S921 and S922. When the first distance value measured in step S921 is z1 and the relative position value measured in step S922 is (x1, y1), the position value corresponding to the marker MK1 is (x1, y1, z1). On the other hand, when the pre-learned position value of the marker MK1 is (x0, y0, z0), it is checked whether there is a difference by comparing (x1, y1, z1) and (x0, y0, z0).

If there is no substantial difference ("No" in S931), the transport vehicle 200 performs a loading or unloading operation (see S991 in FIG. 16). For example, if the transport vehicle 200 is in a state of gripping the article, the transport vehicle 200 unloads the article from the first storage area 11a. Alternatively, if the transport vehicle 200 does not grip the article and the article is on the first storage area 11a, the transport vehicle 200 loads the article which is on the first storage area 11a.

Next, if the position value of the marker MK1 is different from the pre-learned position value ("Yes" in S931), it is checked whether the difference exceeds a tolerance (see S935 in FIG. 16).

If the difference does not exceed the tolerance ("No" in S935), the position of the transport vehicle 200 is corrected (see S951 in FIG. 16).

A difference that does not exceed the tolerance may be overcome by correcting the position of the transport vehicle. The transport vehicle 200 is moved based on the measured position of the marker MK1. For example, the transport vehicle 200 may be moved to be closer to the measured marker MK1. According to the difference, an amount of movement of the transport vehicle 200 is determined. The transport vehicle 200 is moved within a workable range of the first storage area 11a.

Next, a history of correcting the position of the transport vehicle 200 is updated (see S992 in FIG. 16).

On the other hand, if the difference exceeds the tolerance ("Yes" in S935), an alarm indicating that work is impossible is generated (see S993 in FIG. 16).

The difference exceeding the tolerance may not be overcome through the position correction of the transport vehicle 200. When the alarm is generated, a manager (or operator) may analyze and/or modify the alarm.

Meanwhile, although not illustrated in a separate drawing, by comparing the first distance value calculated using the distance sensor 231 with the second distance value calculated using the vision sensor 232, a quality of the marker MK1 installed on the overhead rack 10 may be checked.

Figure 17:
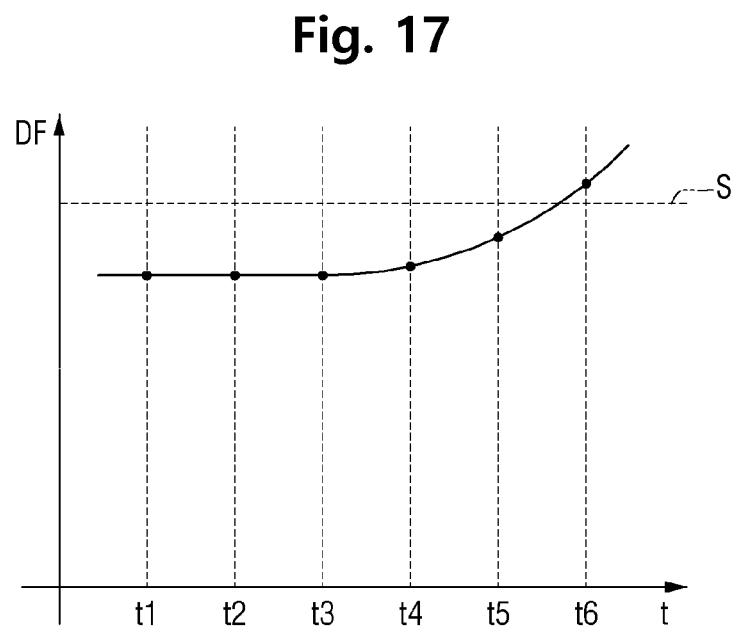

FIG. 17 is a view illustrating a control method of a ceiling storage system according to some exemplary embodiments of the present disclosure.

An example of history management will be described with reference to FIG. 17. As described above, in the case in which the transport vehicle 200 works on the first storage area 11a, if the position of the transport vehicle 200 is corrected, a history thereof is stored and managed.

FIG. 17 illustrates, for example, an amount of change DF measured at a plurality of working points of time t1 to t6. The amount of change DF is constant at the working points of time t1 to t3, but the amount of change DF starts to increase rapidly at the work points of time t4 to t6. When the amount of change DF exceeds a threshold value S, an alarm is generated. For example, since the amount of change DF exceeds the threshold value S at the work point of time t6, the alarm is generated.

Although the history management of the amount of change DF is described in FIG. 17, the present disclosure is not limited thereto. In addition to the amount of change DF, the first distance value, the relative position value, the teaching value, and the like may also be history managed.

The exemplary embodiments of the present disclosure have been described above with reference to the accompanying drawings, but the present disclosure may be implemented in various different forms, and those skilled in the art to which the present disclosure pertains may understand that the present disclosure may be implemented in other specific forms without changing the technical spirit or essential features of the present disclosure. Therefore, it should be understood that the exemplary embodiments described above are illustrative in all aspects and not restrictive.

What is claimed is:

1. A ceiling storage system comprising:
an overhead rack including a plurality of storage areas for storing a plurality of articles;
first and second support rails disposed above the overhead rack and extending lengthwise in one direction;
a first driving rail disposed above the overhead rack and disposed in parallel with the first and second support rails;
a second driving rail movably coupled to the first and second support rails and the first driving rail and moving along the first and second support rails and the first driving rail;
a transport vehicle including a carriage coupled movably along the second driving rail, a hoist installed on the carriage and for loading and unloading the articles to and from the overhead rack, and a hand unit; and
a distance sensor and a vision sensor installed on the transport vehicle,
wherein the transport vehicle moves to an upper portion of a first storage area of the plurality of storage areas in a state of gripping an article of the plurality of articles,
wherein the transport vehicle measures a first distance value between the transport vehicle and the first storage area using the distance sensor and measures a relative position value between the transport vehicle and the first storage area using the vision sensor, before unloading the article from the first storage area,
wherein a three-dimensional position value of the first storage area is calculated based on the first distance value and the relative position value,
wherein an amount of change is calculated by comparing the calculated three-dimensional position value with a pre-learned three-dimensional position value,
wherein the transport vehicle is moved by reflecting the amount of change,
wherein the transport vehicle unloads the article from the first storage area,
wherein the calculated amount of change and a tolerance are compared between the calculating of the amount of change and the moving of the transport vehicle by reflecting the amount of change, and
wherein the moving of the transport vehicle by reflecting the amount of change is performed when the calculated amount of change is within the tolerance.

2. The ceiling storage system of claim 1, wherein a teaching value corresponding to the first storage area is modified by reflecting the amount of change, after the transport vehicle unloads the article from the first storage area.

3. The ceiling storage system of claim 2, wherein a history of the amount of change or the modified teaching value is managed.

4. The ceiling storage system of claim 1, wherein an alarm is generated indicating that the article is not unloaded from the first storage area when the calculated amount of change is out of the tolerance.

5. The ceiling storage system of claim 1, wherein at least one marker is installed on the overhead rack, and the vision sensor photographs the at least one marker.

6. The ceiling storage system of claim 5,
wherein two or more markers are installed adjacent to the first storage area, and
wherein the calculated amount of change includes an amount of change in at least one of an X-axis direction, a Y-axis direction, and an R-axis direction.

7. The ceiling storage system of claim 1,
wherein a second distance value between the transport vehicle and the first storage area is calculated using the vision sensor, and
wherein a quality of a marker installed on the overhead rack is checked by comparing the first distance value and the second distance value.

8. The ceiling storage system of claim 1, wherein the first driving rail is disposed between the first support rail and the second support rail, and the second driving rail extends in a direction perpendicular to the one direction.

9. The ceiling storage system of claim 1, wherein the first overhead rack includes a plurality of storage spaces and a plurality of maintenance spaces, each storage space including the plurality of storage areas, and the plurality of storage spaces and the plurality of maintenance spaces being alternately arranged.

10. The ceiling storage system of claim 9, further comprising:
an access road extending lengthwise in the one direction and connected to the plurality of maintenance spaces,
wherein the access road is configured to provide access to the plurality of maintenance spaces.

11. The ceiling storage system of claim 1, further comprising:
a first interface port disposed adjacent to the overhead rack,
wherein the transport vehicle moves the article to the first interface port, and an overhead hoist transport (OHT) picks up and moves the article.

12. The ceiling storage system of claim 1, further comprising:
a second interface port disposed below the overhead rack and having an open upper surface,
wherein the transport vehicle picks up the article from the overhead rack and moves the article to the second interface port through the open upper surface, and
wherein an operator or autonomous vehicle picks up and moves the article from the second interface port.

13. A control method of a ceiling storage system, the control method comprising:
providing the ceiling storage system including an overhead rack including a plurality of storage areas, a first support rail, a second support rail, and a first driving rail disposed above the overhead rack and extending lengthwise in a first direction, a second driving rail movably coupled to the first support rail, the second support rail, and the first driving rail, a transport vehicle movable along the second driving rail, and a distance sensor and a vision sensor installed on the transport vehicle;

moving the transport vehicle to an upper portion of a first storage area of the plurality of storage areas in a state of gripping an article;
measuring, by the transport vehicle, a first distance value between the transport vehicle and the first storage area using the distance sensor and measuring a relative position value between the transport vehicle and the first storage area using the vision sensor, before unloading the article from the first storage area;
calculating a three-dimensional position value of the first storage area based on the first distance value and the relative position value;
calculating an amount of change by comparing the calculated three-dimensional position value with a pre-learned three-dimensional position value;
moving the transport vehicle by reflecting the amount of change; and
unloading, by the transport vehicle, the article from the first storage area,
wherein the calculated amount of change and a tolerance are compared between the calculating of the amount of change and the moving of the transport vehicle by reflecting the amount of change, and
wherein the moving of the transport vehicle by reflecting the amount of change is performed when the calculated amount of change is within the tolerance.

14. The control method of claim 13, further comprising:
modifying a teaching value corresponding to the first storage area by reflecting the amount of change, after the transport vehicle unloads the article from the first storage area; and
managing a history of the amount of change or the modified teaching value.

15. The control method of claim 13, further comprising:
calculating a second distance value between the transport vehicle and the first storage area using the vision sensor, and
checking a quality of a marker installed on the overhead rack by comparing the first distance value and the second distance value.

16. A control method of a ceiling storage system, the control method comprising:
providing the ceiling storage system including an overhead rack on which a plurality of marks are installed, a first support rail, a second support rail, and a first driving rail disposed above the overhead rack and extending lengthwise in a first direction, a second driving rail movably coupled to the first support rail, the second support rail, and the first driving rail, a transport vehicle movable along the second driving rail, and a distance sensor and a vision sensor installed on the transport vehicle;
moving the transport vehicle to an upper portion of a first storage area of a plurality of storage areas in a state of gripping an article;
measuring a first distance value between the transport vehicle and the first storage area using the distance sensor;
measuring a relative position value between the transport vehicle and the first storage area by photographing a plurality of markers using the vision sensor;
calculating a three-dimensional position value of the first storage area based on the first distance value and the relative position value;
checking whether the calculated three-dimensional position value is different from a pre-learned three-dimensional position value;

correcting a position of the transport vehicle and updating a history of correcting the position of the transported vehicle, when the difference is within a tolerance; and generating an alarm indicating that work is impossible when the difference is out of the tolerance.

* * * * *